(12) United States Patent
Connell et al.

(10) Patent No.: US 9,774,712 B2
(45) Date of Patent: Sep. 26, 2017

(54) MODULAR CONTROL INTERFACE

(71) Applicant: Motorola Mobility LLC, Chicago, IL (US)

(72) Inventors: Nathan M Connell, Glenview, IL (US); Jarrett K Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/827,471

(22) Filed: Aug. 17, 2015

(65) Prior Publication Data

US 2017/0041442 A1 Feb. 9, 2017

Related U.S. Application Data

(60) Provisional application No. 62/200,527, filed on Aug. 3, 2015.

(51) Int. Cl.
| | |
|---|---|
| *H04B 1/38* | (2015.01) |
| *H04M 1/02* | (2006.01) |
| *G06F 3/16* | (2006.01) |
| *H04N 5/225* | (2006.01) |

(52) U.S. Cl.
CPC .......... *H04M 1/0254* (2013.01); *G06F 3/162* (2013.01); *H04N 5/2257* (2013.01); *H04B 1/38* (2013.01); *H04M 1/0274* (2013.01)

(58) Field of Classification Search
CPC .. H04M 1/0254; H04M 1/0274; H04N 5/225; G06F 3/162; H04B 1/38

USPC ................................................ 455/557, 41.1
See application file for complete search history.

(56) References Cited

U.S. PATENT DOCUMENTS

| | | | |
|---|---|---|---|
| 2003/0109280 A1* | 6/2003 | Bodnar ................... | H04M 1/21 455/556.1 |
| 2008/0137268 A1* | 6/2008 | Mayette ............... | H04R 1/1091 361/807 |
| 2008/0278894 A1* | 11/2008 | Chen ..................... | G06F 1/1632 361/679.01 |
| 2010/0081377 A1* | 4/2010 | Chatterjee ............. | G06F 1/1632 455/41.1 |
| 2010/0131691 A1* | 5/2010 | Chatterjee ................. | G06F 1/26 710/303 |
| 2010/0171464 A1* | 7/2010 | Choi ......................... | B25J 5/00 320/114 |
| 2010/0173673 A1* | 7/2010 | Lydon ..................... | G06F 21/44 455/557 |
| 2011/0055407 A1* | 3/2011 | Lydon ................... | G06F 13/385 709/228 |

(Continued)

*Primary Examiner* — Mong-Thuy Tran
(74) *Attorney, Agent, or Firm* — Miller, Matthias & Hull LLP

(57) ABSTRACT

A modular portable device system and method improves the quality of the interface between a core device and an add-on module via an interconnection system specifically applicable to modular systems. A multi-pin connector array accessible from outside the base device is configured and located to electrically connect to a mating array on the add-on module when the two devices are docked. In an embodiment, the multi-pin connector array includes a command/control pin configured to support multiple functions such as, but not limited to, device detection, interrupt functions, mode changes and wake functions.

20 Claims, 6 Drawing Sheets

(56) References Cited

U.S. PATENT DOCUMENTS

| | | | | |
|---|---|---|---|---|
| 2011/0167176 A1* | 7/2011 | Yew | ............... | G06F 13/4247 |
| | | | | 710/6 |
| 2013/0027871 A1* | 1/2013 | Cheng | ............... | G06F 1/1632 |
| | | | | 361/679.41 |
| 2014/0274200 A1* | 9/2014 | Olson | ............... | H04B 1/3877 |
| | | | | 455/552.1 |
| 2014/0361751 A1* | 12/2014 | Strauser | ............... | G06F 1/266 |
| | | | | 320/137 |
| 2016/0292095 A1* | 10/2016 | Hinkle | ............... | G06F 13/1673 |

* cited by examiner

MODULAR CONTROL INTERFACE

TECHNICAL FIELD

The present disclosure is related generally to mobile communication devices, and, more particularly, to a system and method for interconnection in a modular portable communication device.

BACKGROUND

While modern portable electronic devices are highly capable, the average user does not use all, or even most, of the capabilities of their device. Moreover, users continue to ask for lighter devices. Taking these observations together, a modular device approach may be seen as one solution to provide a customized device experience. In a modular approach, each user's device is customized via add-on modules, to support the extended functions that the user does desire without unnecessarily complicating the base device.

In this model, a light and thin base cellular device is provided having certain basic functions such as phone, text, WiFi, email and basic sound and photo capabilities. Add-on modules can be docked to the base device to add more powerful features or sets of features. For example, a more professional camera module can be used to extend the basic photo abilities of the base module. Similarly, an audio module may be added to enable better sound quality as compared to the basic speaker system built into the base device.

However, the efficiency with which the module and base device operate is limited by the quality of the interface between the devices. For example, a standard USB 24 interface may be too slow, too power intensive and too complicated for ready adoption in such a scenario.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art currently in the public domain. As such, the inventors expressly disclaim this section as admitted or assumed prior art. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a fuller discussion of the disclosed principles, an overview is given to aid the reader in understanding the later discussion. As noted above, in a modular design, the quality of the interface between the core device and the add-on module affects the efficiency and operation of the combined device as a whole. The inventors have derived an interconnection solution specifically applicable to modular systems.

In particular, in an embodiment of the disclosed principles, a modular device system is provided including a base portable electronic communication device that is connectable to an add-on module. A multi-pin connector array accessible from outside the base portable communication device is configured and located to electrically connect to a mating array on an add-on module when the two devices are docked.

In an embodiment, the multi-pin connector array includes a command/control pin configured to allow the base device to detect the docking of the add-on device, and to execute control and command functions with respect to the add-on device. For example, the multi-pin connector array may support a number of data exchange interfaces, each having a different data rate, and based on the differing rates, a different presumptive data type. The command/control pin may be used in this embodiment to identify one or more interfaces to be used for one or more data types supported by the add-on module. In addition, the command/control pin may be used for detection functions, interrupt functions, mode changes and wake functions.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

Figure 1:
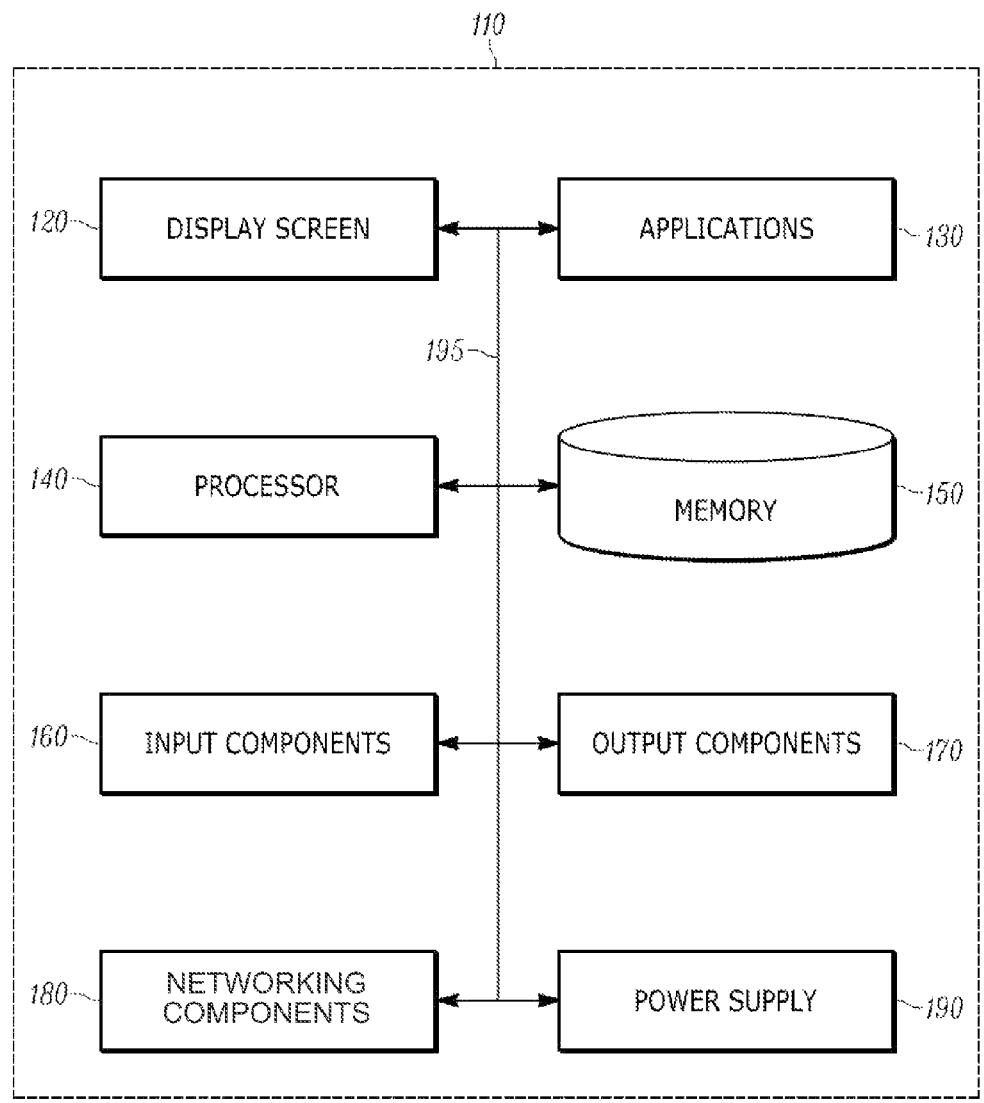
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware networking components 180 to allow communications to and from the device. Such networking components 180 will typically provide wireless networking functionality, although wired networking may additionally or alternatively be supported.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

In the context of a modular device system, each of the core device and the add-on module may have some or all of the components shown and discussed with respect to FIG. 1. For example, the core device may include all of the illustrated components and the add-on module may omit the display screen 120. Similarly, the core device may include networking functionality while the add-on module has no such capabilities and accesses any networks through the core device. In this description, the core device and add-on module may both be referred to as mobile electronic devices, whether stand-alone capable or not. An example of this usage is that the second device (add-on module) docks to the first device (core device).

Figure 2:
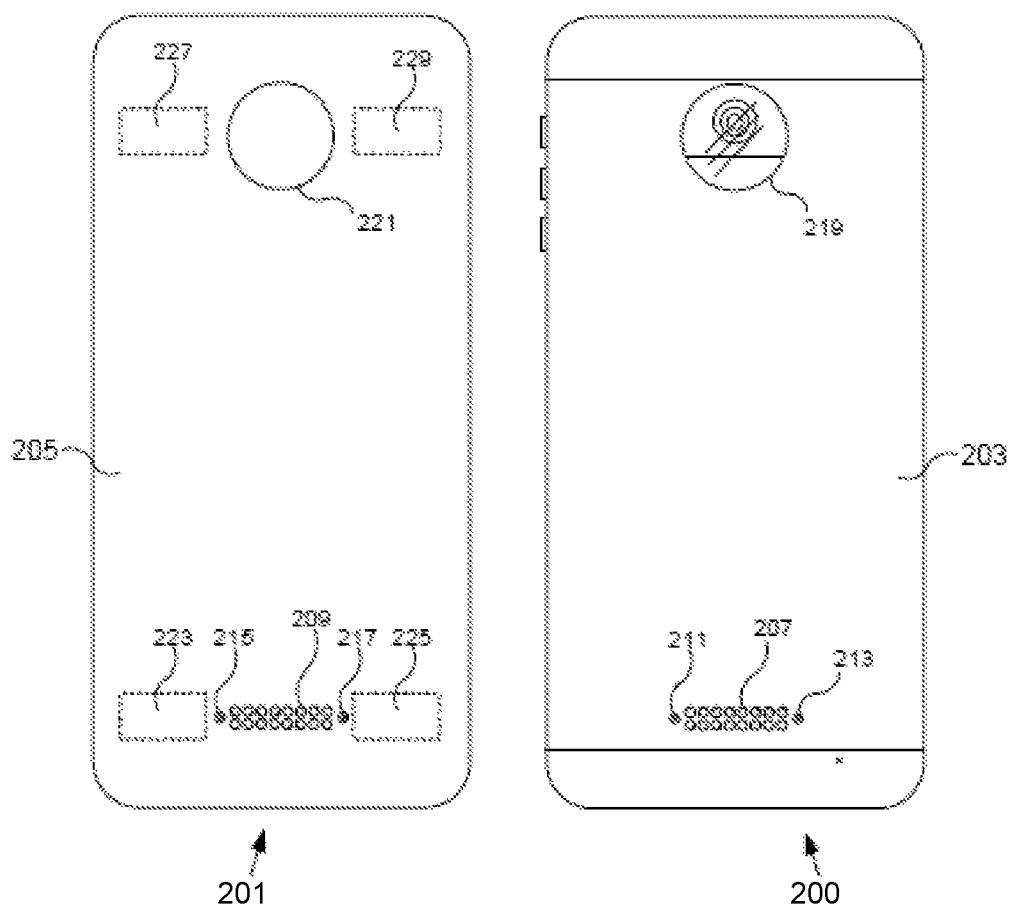
FIG. 2 is view of a first device and a second device, showing the back of the first device and the back of the second device in accordance with an embodiment of the disclosed principles.

Turning to FIG. 2, this figure illustrates a view of the first device 200 and the second device 201, showing the front 203 of the first device 200 and the mating back 205 of the second device 201 in accordance with an embodiment of the disclosed principles. In the illustrated example, each device 200, 201 includes a connector array 207, 209. Although each connector array 207, 209 is shown as a 16-pin connector array, it will be appreciated that other numbers of pins may be used. Although not detailed in the figure, one of the connector arrays 207, 209 will typically include male pins while the other 207, 209 will typically include female sockets.

A set of alignment pins 211, 213 is included adjacent the connector array 207 on the first device 200 in the illustrated embodiment, for mating with matching alignment sockets 215, 217 on the second device 201. A third alignment point is provided by a camera protrusion 219 on the first device 200, which is configured and located to fit with a mating opening 221 in the second device 201.

In an embodiment, a set of magnets 223, 225, 227, 229 is embedded in the back of the second device 201. A corresponding set of magnetically responsive inserts (not shown) in the first device stick to the magnets and hold the devices 200, 201 together when the devices 200, 201 are docked together.

Figure 3:
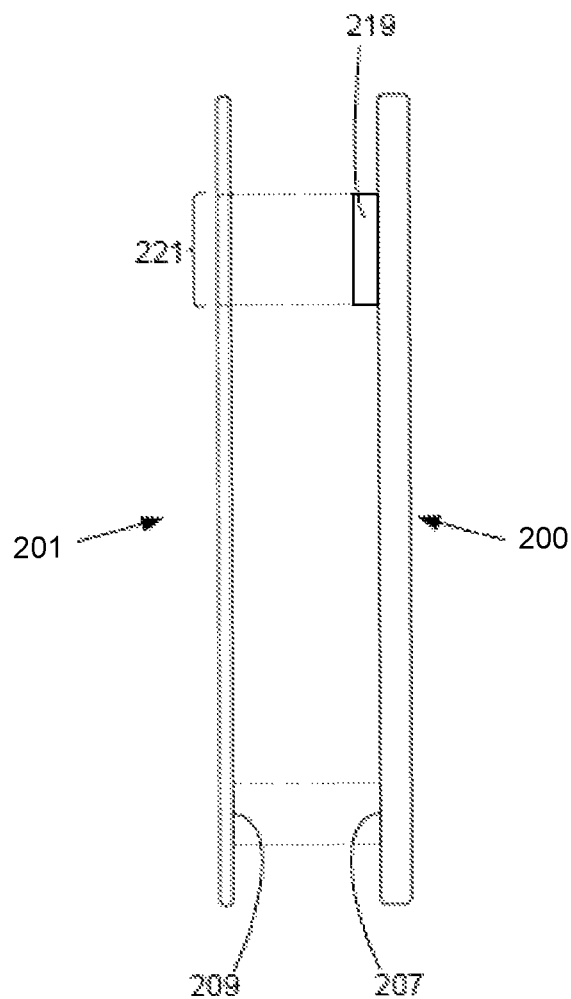
FIG. 3 is a side view of the first device and the second device in accordance with an embodiment of the disclosed principles.

As briefly shown in the side view of FIG. 3, when the first device 200 and the second device 201 are docked together, the camera protrusion 219 fits into the mating opening 221 in the second device 201. In addition, the contact array 207 of the first device 200 mates with the contact array 209 of the second device 201 in this configuration.

Ideally the combined device acts as one, with respect to response time and capabilities. However, existing interconnection technologies do not effectively provide this level of performance and capabilities. However, in an embodiment, a unique interconnection architecture is provided to achieve the desired behavior, as will be discussed in greater detail below.

Figure 4:
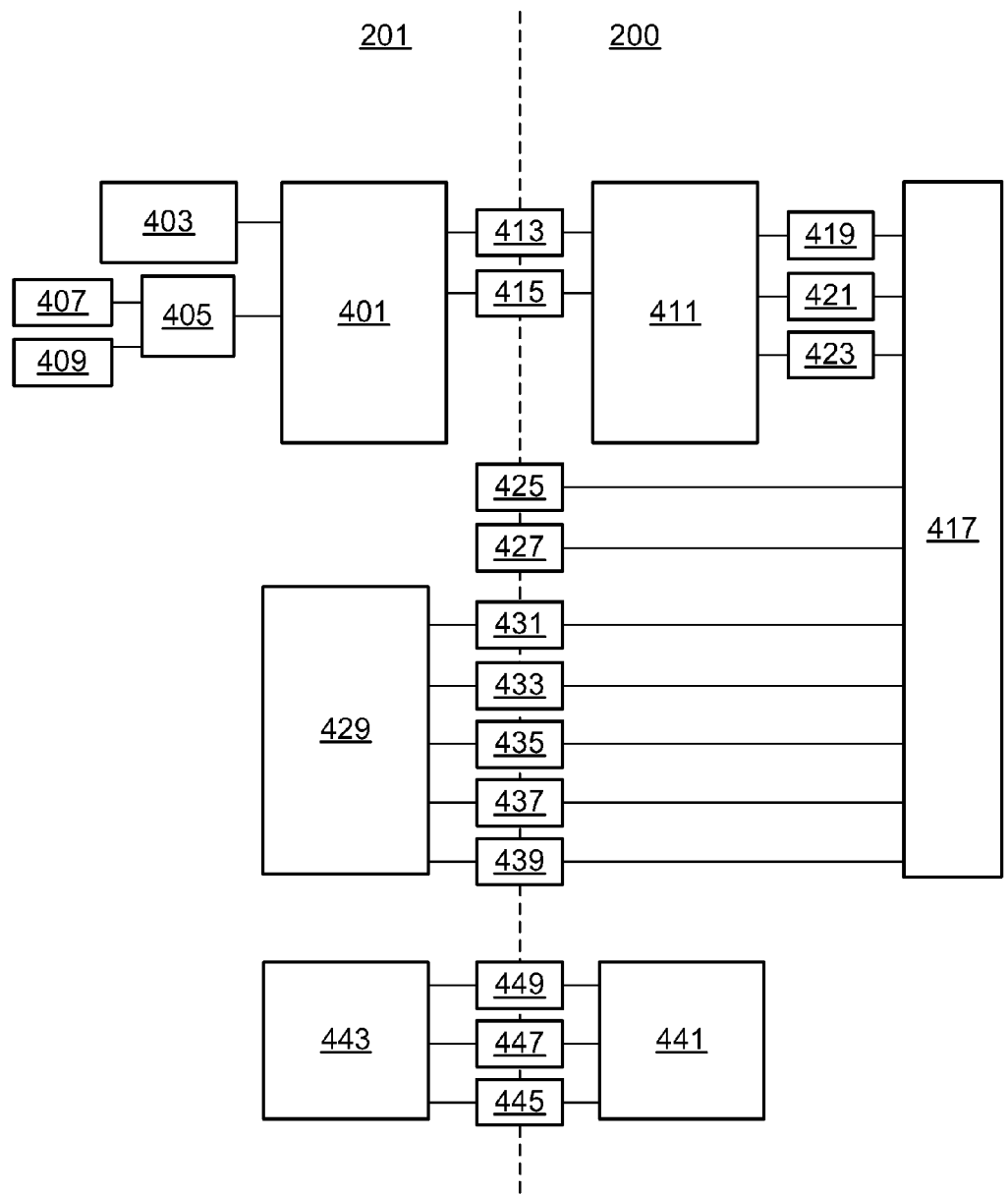
FIG. 4 is a circuit level schematic showing an interconnection architecture in accordance with an embodiment of the disclosed principles.

Referring to FIG. 4, this figure shows a circuit level schematic of a device interconnection architecture in keeping with various embodiments of the disclosed principles. On the side of the second device 201 in the illustration, the device 201 includes an application processor bridge 401 (AP Bridge) linked to a number of other modules and interfaces. In particular, a display 403 and an ISP 405 (e.g., interfaced to a camera 407 and a microphone 409) are linked to the AP Bridge 401 in the illustrated example.

In addition, the AP Bridge 401 interfaces to a similar AP Bridge 411 in the first device 200 via a 2-pin interface 413 for receiving and another 2-pin interface 415 for transmission. These may be for example M-PHY interfaces directly from the AP Bridge chips 401, 411. It will be appreciated that "M-PHY" is a particular specification for data and communication interfaces, but that other types of interfaces may be used. In an embodiment each 2-pin pair 413, 415 is capable of transferring 6 GB/s.

On the first device 200, the AP Bridge 411 is linked to an AP 417 via a CSI link 419, a DSI link 421, and a UART link 423. In addition, the AP 417 exposes several pins directly to the interconnector array. These include for example, single-pin DP (USB D Plus) and DM (USB D Minus) interfaces 425, 427. The AP 417 is also linked to a mod processing unit 429 of the second device 201 via several single-pin interfaces including CLK 431 (SPI Clock)), CS_N 433 (SPI Chip Select), MISO 435 (SPI Receive) and MOSI 437 (SPI Transmit) interfaces. A control/command pin 439 between the mod processing unit 429 and the AP 417 serves a number of purposes, including, in an embodiment, device detection, mode changes, and others.

Finally, certain pins serve to provide power or power-related functions. In the illustrated embodiment, a power management IC (PMIC) 441 at the first device 200 is linked to charging and related circuitry 443 on the second device 201. In a further embodiment, the associated pins include a 2-pin voltage connection 445 (USB/Charging Voltage) and a 2-pin ground connection 447 (Digital/Power Ground). A final pin 449 (Raw Battery Voltage) provides a charging path between the devices 200, 201.

It will be appreciated that certain pins may serve different purposes depending on the interface mode of the second device 201. As noted above, the control/command pin 439 serves a number of purposes, including changing the interface mode of the second device. Thus, for example, the CLK 431 and CS_N 433 pins may instead serve as I2C SCL and I2C SDA respectively.

As can be seen, many native interfaces are directly exposed between the devices 200, 201 in this configuration. These include the SPI signals exposed on the CLK 431, CS_N 433, MISO 435 and MOSI 437 pins for example, as well as the M-PHY communications exposed on the 2-pin interfaces 413, 415.

In an embodiment, the disclosed architecture provides a multi-rate interface for transmission of data between the add-on module and the base device. It will be appreciated that a high rate interface consumes more power than a low rate interface even when the instantaneous data transmission requirements do not require consume the bandwidth of the high rate interface. This is due, for example, to the use of higher frequencies over the high rate interface.

Thus, in this embodiment, multiple separate interfaces are provided for use in transmission of data with various data rate requirements. These may include a high rate interface, a medium rate interface, a low rate interface, an audio rate interface and a DC interface. The high rate interface may be required for data intensive transmissions such as the exchange of display and video data, while the low rate interface is useful for monitoring or other low rate data such as UV sensor data and the like. The medium or intermediate rate interface may be used for data requiring more bandwidth than the monitoring level of data, or that may have a variable rate with an upper end that falls above the low rate bandwidth.

The lower level interfaces, i.e., the audio and DC interfaces may be used when the higher rate interfaces are not needed. For example, as implied by the names, the audio interface provides sufficient bandwidth for audio and other low rate signals, while the DC interface allows simple yes/no, on/off and power signals.

Figure 5:
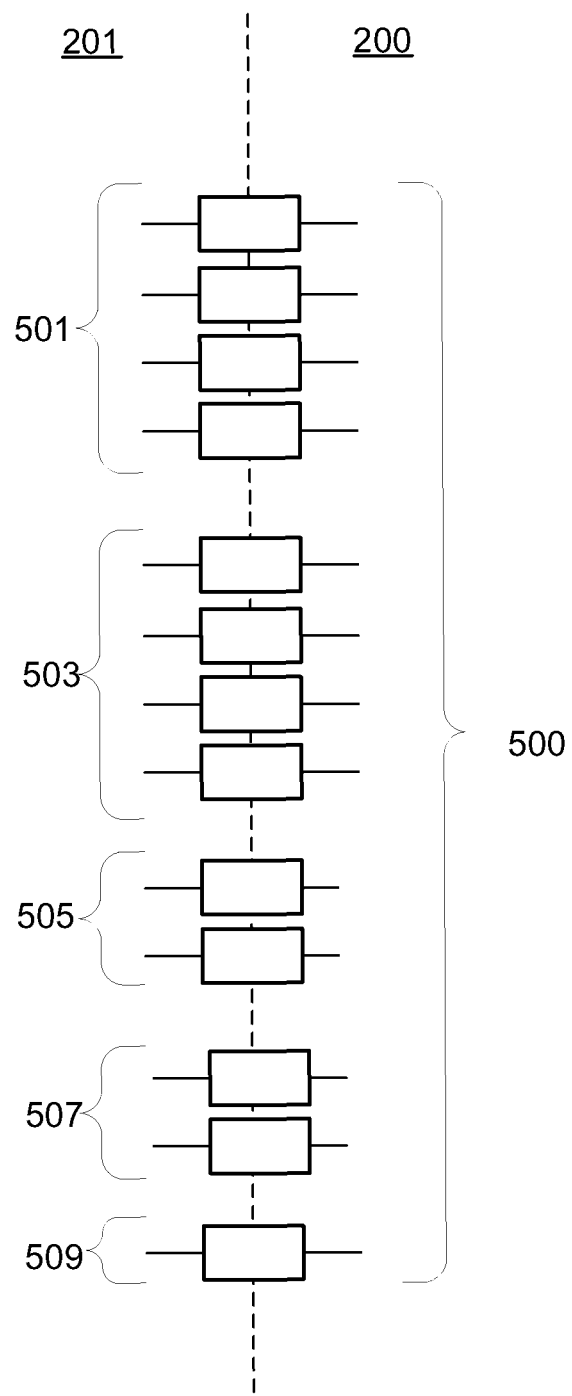
FIG. 5 is a pin-level diagram showing pin assignments and channels in accordance with an embodiment of the disclosed principles.

FIG. 5 illustrates the use of a selectable multi-rate interface between the add-on device 201 and the base device 200. As can be seen, the available interfaces 500 include a high rate interface 501 having 4 pins, a medium rate interface 503 having 4 pins and a low rate interface 505 having 2 pins. The audio interface 507 also utilizes 2 pins while the DC interface 509 uses a single pin.

When the devices 200, 201 are initially connected, the base device 200 may detect the presence of the add-on device 201 via the control/command pin, discussed above with reference to FIG. 4, and may initiate a handshake sequence on that pin. Included in the handshake data may be a capabilities transmission specifying the capabilities of the second device 201 to the first device 200. During this handshake sequence, the devices 200, 201 agree to the use of a particular interface for particular types of data, e.g., that the add-on device 201 will exchange display data with the base device 200 over the high rate interface 501. Changing of the exchange mode may be later initiated by the base device 200 using the command/control pin. In an embodiment, the second device is able to request a change in interface mode, either via the control/command pin or otherwise.

As noted above, the command/control pin of the multi-pin interface may be used to identify one or more interfaces to be used for one or more data types supported by the add-on module, as well as for detection functions, interrupt functions, mode changes and wake functions.

Figure 6:
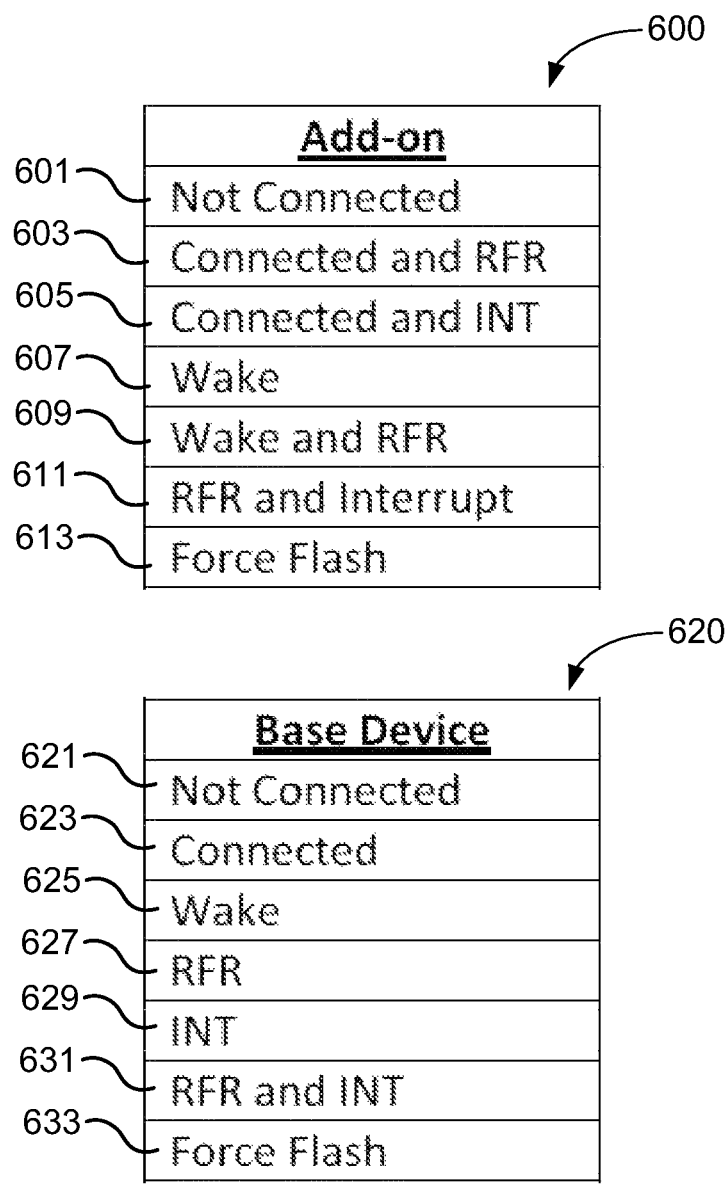
FIG. 6 is a pin schedule showing pin assignments for the command/control pin of the multi-pin interface in accordance with an embodiment of the disclosed principles.

FIG. 6 shows possible functional assignments of the control/command pin in an embodiment of the disclosed principles. As can be seen, the control/command pin serves a recognized role to both the base device 200 and the add-on device 201. Thus, for example, as reflected at entry 601 of the add-on table 600 and entry 621 of the base device table 620, the control/command pin may serve to alert the base device that the add-on device is not connected. The signal associated with this state would typically be an open voltage unless defined otherwise in a given implementation.

Similarly, the command/control pin also serves to detect the presence of the add-on device through contact with the pin. Thus at entries 603 and 605 of the add-on table 600 and entry 623 of the base device table 620, the control/command pin shows the connected status of the add-on device. In addition, the pin may indicate the device's state of readiness, as reflected in the RFR status. As will be appreciated, the different messages may be signaled via different signal patterns or levels.

Entries 607 and 609 of the add-on table 600 and entry 625 of the base device table 620, the control/command pin is used to cause and to signal waking or the awake state of the add-on device. Thus, for example, the base device 200 may use the command/control pin to wake the add-on device 201.

As noted above, the command/control pin is also usable to interrupt the add-on device 201 processor, as is reflected at entry 611 of the add-on table 600 and entries 629 and 631 of the base device table 620. Finally, as can be seen in entry 613 of the add-on table 600 and entry 633 of the base device table 620, the control/command pin provides a channel for programming the add-on device, e.g., to change mode, parameters, and so on, via a force flash programming.

It will be appreciated that a system and method for improved device interconnection in a modular environment have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A modular device system including:
   a base portable electronic communication device comprising:
   a multi-pin connector array accessible from outside the base portable communication device, the multi-pin connector array being substantially flush with the outside of the base portable communication device and being configured and located to electrically connect to a mating array on and substantially flush with an outside of an add-on module when the add-on module is placed adjacent to the base portable electronic communication device; and
   an application processor configured to control a plurality of device functions on the base portable electronic communication device, the application processor being configured to utilize a control and command pin of the multi-pin connector array to send and receive control and command instructions and data to and from the add-on module.

2. The modular device system in accordance with claim 1, wherein the multi-pin connector array includes multiple female pin sockets.

3. The modular device system in accordance with claim 1, wherein the multi-pin connector array includes multiple male pins.

4. The modular device system in accordance with claim 1, wherein the application processor of the base device is further configured to assert an interrupt over the control and command pin.

5. The modular device system in accordance with claim 1, wherein the application processor of the base device is further configured to detect the presence of the add-on module via the control and command pin.

6. The modular device system in accordance with claim 1, wherein the application processor of the base device is further configured to wake the add-on module via the control and command pin.

7. The modular device system in accordance with claim 1, wherein the application processor of the base device is further configured to receive an indication of readiness of the add-on module over the control and command pin.

8. The modular device system in accordance with claim 1, wherein the application processor of the base device is further configured to receive an indication of awake status of the add-on module over the control and command pin.

9. A modular device system including:
   an electronic module having a processor for providing a module function, the electronic module having a module interface array substantially flush with an outside surface of the electronic module; and
   a base portable electronic communication device comprising:
   a multi-pin connector array substantially flush with an outer surface of the base portable electronic device and being configured and located to electrically connect to the module interface array of the electronic module when the electronic module is docked adjacent the base device, the multi-pin connector array including a command and control pin; and
   an application processor configured to control a plurality of device functions on the base device, the application processor being configured to utilize the control and command pin of the multi-pin connector array to send and receive control and command instructions and data to and from the module.

10. The modular device system in accordance with claim 9, wherein the multi-pin connector array includes multiple female pin sockets.

11. The modular device system in accordance with claim 9, wherein the multi-pin connector array includes multiple male pins.

12. The modular device system in accordance with claim 9, wherein the application processor of the base device is further configured to assert an interrupt over the control and command pin.

13. The modular device system in accordance with claim 9, wherein the application processor of the base device is further configured to detect the presence of the add-on module via the control and command pin.

14. The modular device system in accordance with claim 9, wherein the application processor of the base device is further configured to wake the add-on module via the control and command pin.

15. The modular device system in accordance with claim 9, wherein the application processor of the base device is further configured to receive an indication of readiness of the add-on module over the control and command pin.

16. The modular device system in accordance with claim 9, wherein the application processor of the base device is further configured to receive an indication of awake status of the add-on module over the control and command pin.

17. A modular electronic device for docking to a base electronic device, the modular electronic device including:
   a multi-pin module interface substantially flush with an outside surface of the modular electronic device including a control and command pin; and
   a module processor for executing one or more module functions in conjunction with the base electronic device when the base electronic device is placed adjacent the modular electronic device at the multi-pin module interface, wherein the module processor is configured to utilize the control and command pin to send and receive control data to and from the module.

18. The modular electronic device in accordance with claim 17, wherein the control data include wake signals.

19. The modular electronic device in accordance with claim 18, wherein the control data include readiness signals.

20. The modular electronic device in accordance with claim 18, wherein the control data include a programming response signal.

* * * * *